United States Patent [19]

Makino et al.

[11] 4,266,950

[45] May 12, 1981

[54] BUBBLING TYPE DISSOLVED GAS SEPARATOR

[75] Inventors: Yoshihiro Makino; Toshihiko Yoshihara, both of Akoh, Japan

[73] Assignee: Mitsubishi Denki Kabushiki Kaisha, Tokyo, Japan

[21] Appl. No.: 53,520

[22] Filed: Jun. 29, 1979

[30] Foreign Application Priority Data

Jun. 30, 1978 [JP] Japan ............... 53-90576[U]

[51] Int. Cl.³ ................................ B01D 19/00
[52] U.S. Cl. .......................... 55/196; 55/199; 366/273
[58] Field of Search ........... 55/52, 53, 185, 196, 55/199, 203, 274, 182, 184, 207; 366/273, 274, 302

[56] References Cited

U.S. PATENT DOCUMENTS

| | | | |
|---|---|---|---|
| 2,773,747 | 12/1956 | King et al. | 366/273 X |
| 3,580,812 | 5/1971 | Bender et al. | 435/315 |
| 3,649,465 | 3/1972 | Scharf et al. | 435/316 X |
| 3,888,466 | 6/1975 | Sedam | 366/274 |
| 4,162,855 | 7/1979 | Bender | 366/274 |

FOREIGN PATENT DOCUMENTS 200972  2/1956  Australia ................ 366/302

Primary Examiner—Peter A. Hruskoci
Attorney, Agent, or Firm—Oblon, Fisher, Spivak, McClelland & Maier

[57] ABSTRACT

A bubbling type dissolved gas separator comprises a vessel, a cover, a liquid feeding passage, a bubbling gas feeding passage, a gas outlet passage, a liquid discharging passage and a magnetic stirrer which is held to rotate in a plane being perpendicular to the bottom surface of the vessel and a baffle plate for preventing waving of a liquid contained in the vessel.

This bubbling type dissolved gas separator can be used in an automatic analyzer for a dissolved gas in a transformer oil or the other liquid.

3 Claims, 2 Drawing Figures ically held on the shaft and accordingly, the revolutional velocity can be highly increased and the effect of gas-liquid contact can be improved. Moreover, the bubbling gas fed into

BUBBLING TYPE DISSOLVED GAS SEPARATOR

BACKGROUND OF THE INVENTION

1. Field of the Invention

The present invention relates to an improved bubbling type dissolved gas separator.

2. Description of the Prior Arts

FIG. 1 is a schematic sectional view of one embodiment of the conventional bubbling type dissolved gas separators.

A closed type vessel (1) having a flange of the conventional bubbling type dissolved gas separator is covered by a cover (2) having a flange. A liquid feeding passage (6), a bubbling gas feeding passage (7) and a gas outlet passage (8) are equipped by passing through the cover (2). A liquid discharging passage (9) is connected at the bottom of the vessel (1). Valves (5a)-(5d) such as solenoid valves are respectively connected to these passages (6)-(9) so as to feed the object fluids to inside or outside of the vessel (1) under controlled conditions. A magnetic stirrer (3) is put on the bottom of the vessel (1) and is rotated by a rotary magnet connected to a motor equipped at the outside of the vessel. The cover (2) is sealed with an O-ring (10).

In the separation of the dissolved gas by using such separator, the valve (5a) of the liquid feeding passage (6) and the valve (5c) of the gas outlet passage (8) are opened and a predetermined volume of the liquid is fed into the closed vessel (1). Then, the motor (4) having a rotary magnet is driven to rotate the rotary magnet (4a) whereby the magnetic stirrer (3) in the closed vessel (1) is rotated to stir the liquid. During stirring the liquid, the valve (5b) of the bubbling gas passage (7) is opened to feed the bubbling gas into the liquid. The dissolved gas in the liquid is separated and entrained with the bubbling gas and is discharged through the gas outlet passage (8) out of the vessel (1).

Thus, the stirring of the liquid in the closed vessel of the conventional separator has been performed by rotating the magnetic stirrer (3) put on the bottom of the closed vessel (1). In such stirring method, the magnetic stirrer (3) is not held by a shaft, and accordingly, the rotary axis is unstable to cause irregular rotation of the magnetic stirrer. The liquid is stirred in vortex flow and accordingly, the level of the liquid is raised by centrifugal force at the part along the inner peripheral part of the vessel. The level of the liquid is especially higher near the inner wall peripheral part of the vessel whereby sometimes the liquid may be passed into the gas outlet passage (8).

The magnetic stirrer (3) is not held whereby the revolutional velocity is relatively low so as to cause unsatisfactory gas-liquid contact.

SUMMARY OF THE INVENTION

It is an object of the present invention to provide a bubbling type dissolved gas separator which imparts an improved effect of gas-liquid contact by stirring and impart high efficiency of separation of the dissolved gas in the dissolved gas separation by the bubbling.

The foregoing and other objects of the present invention have been attained by a bubbling type dissolved gas separator for separating the dissolved gas in the liquid contained in the closed vessel by feeding the bubbling gas into the liquid and rotating the magnetic stirrer in the vessel, by the rotary magnet equipped with the motor placed outside of the vessel, wherein the magnetic stirrer is held to rotate in the plane being substantially perpendicular to the bottom surface and a baffle plate for preventing waving of the liquid placed at a predetermined level in the vessel.

DETAILED DESCRIPTION OF THE PREFERRED EMBODIMENTS

Figure 1:
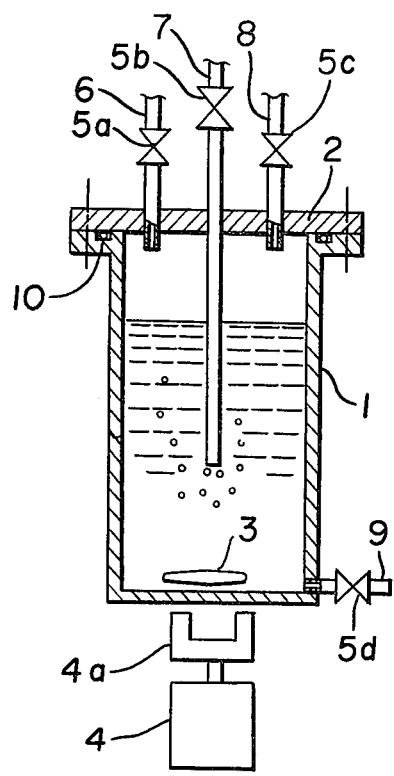
FIG. 1 is a schematic sectional view of a conventional bubbling type dissolved gas separator.
Figure 2:
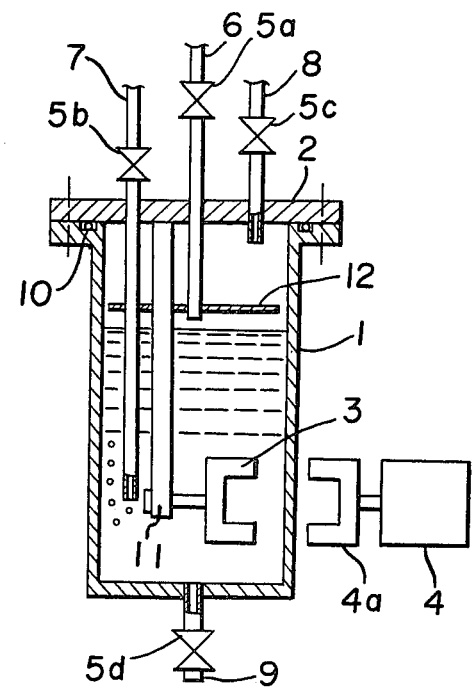
FIG. 2 is a schematic sectional view of a bubbling type dissolved gas separator which is used in an automatic analyzer for a dissolved gas in a transformer oil.

Referring to FIG. 2, one embodiment of the present invention will be illustrated.

FIG. 2 shows one embodiment of the bubbling type dissolved gas separator of the present invention which is used in an automatic analyzer for a dissolved gas in a transformer oil. The vessel (1) having flange is covered by the cover (2) having a flange. The rotary magnet (4a) is rotated by the motor (4). The liquid feeding passage (6), the bubbling feeding gas passage (7) and the gas outlet passage (8) are connected by passing through the cover (2) and the liquid discharging passage (9) is connected near the bottom of the vessel (1) and the valves such as solenoid valves (5a)-(5d) are respectively connected in the passages (6)-(9). The vessel (1) is sealed by the cover (2) through the O-ring (10).

In such structure, the magnetic stirrer (3) which is magnetic rotor or magnet rotor is held at an end of a supporting rod (11) so as to rotate in the plane being substantially perpendicular to the bottom surface, that is the rotary axis of the magnetic stirrer (3) is substantially parallel to the bottom surface of the vessel. The other end of the supporting rod (11) is extended to the upper direction so as to be fixed on the cover (2) having the flange by a known method. A baffle plate (12) for preventing the waving of the stirred liquid is placed on the supporting rod at the place being slightly higher than the level of the liquid in the vessel (1). It is convenient to prepare at least part of the body of the vessel by using a transparent material such as glass or plastic resin so as to be capable of observing inside of the vessel (1).

In the separator of the present invention, the outlet of the bubbling gas feeding passage (7) is placed at a back side of the magnetic stirrer (3). The outlet of the liquid feeding passage (6) is placed below the baffling plate (12). The liquid discharging passage (9) is connected on the bottom surface of the vessel (1). The rotary magnet equipped with the motor (4) is placed near the outer side wall of the vessel so as to concentrically arrange the magnetic stirrer (3) and the rotary magnet (4a).

In accordance with the bubbling type dissolved gas separator of the present invention, the valves are operated as the same as the conventional apparatus and the magnetic stirrer (3) is rotated by feeding the current to the motor (4) whereby the liquid is stirred by the magnetic stirrer (3) rotating in the plane being perpendicular to the bottom surface of the closed vessel (1) and accordingly, the waving on the liquid surface is decreased. Even though such waving of the liquid is caused, the waving is prevented by the baffling plate (12). The magnetic stirrer (3) is mechanically held on the shaft and accordingly, the revolutional velocity can be highly increased and the effect of gas-liquid contact can be improved. Moreover, the bubbling gas fed into the back part of the magnetic stirrer (3) (the left side in FIG. 2) is sucked by the magnetic stirrer (3) and then is thrown against the inner wall of the closed vessel so as to be finely divided to improve the effect of gas-liquid contact and to impart high efficiency of separation of the dissolved gas.

The shape and the size of the magnetic stirrer can be modified as desired. The level of the outlet of the bubbling gas feeding passage (7) is preferably near the level of the magnetic stirrer (3). The rotary magnet (4a) can be an electric magnet or a permanent magnet which can be connected through a reduction gear to the motor (4) or which is directly connected to the motor (4) for variable speed. The liquid feeding passage (6), the bubbling gas passage (7), the gas outlet passage (8) and the valves (5a)–(5d) can be modified as desired. The shape of the baffle plate can be flat or a desired shape so as to prevent the waving. The magnetic stirrer (3) can have a central bearing hole in which a shaft of the supporting rod (11) is inserted. On the other hand, it is also possible to have a bearing hole at the end of the supporting rod (11) in which a shaft of the magnetic stirrer (3) is inserted. The shape of the shaft and the bearing hole can be selected as desired.

The bubbling type dissolved gas separator can be also used for various reactors and other analyzers.

We claim:

1. A bubbling type dissolved gas separator for separating a dissolved gas in a liquid, comprising:
   a closed vessel having a substantially horizontal bottom;
   a baffle plate in said vessel for containing the agitation of said liquid;
   a magnetic stirrer positioned in said vessel and rotatable about an axis parallel to the bottom of said vessel and closely adjacent the lower part of said vessel and a side wall of said vessel;
   magnetic means outside of said vessel for rotating said stirrer about said axis; and
   means for feeding a bubbling gas into said vessel, said means for feeding having a gas outlet adjacent said axis and adjacent the upstream side of said magnetic stirrer,
   whereby said bubbled gas is sucked by the magnetic stirrer, thrown against said wall of said vessel and finely divided.

2. The bubbling type dissolved gas separator according to claim 1 wherein a cover is fitted at a top of said vessel and a supporting rod for supporting said magnetic stirrer is mounted on the rear surface of said cover.

3. The bubbling type dissolved gas separator according to claim 1 or 2 wherein at least part of said vessel is made of a transparent material.

* * * * *